Figure 1:
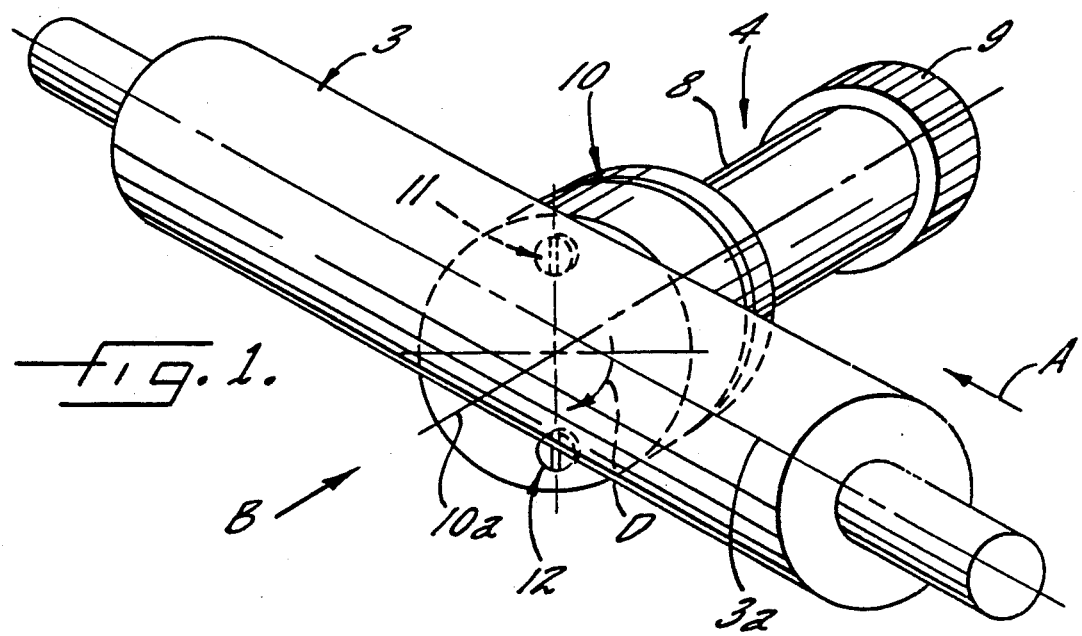

United States Patent [19]

Daetwyler

[11] Patent Number: 5,112,171
[45] Date of Patent: May 12, 1992

[54] MILLING HEAD FOR THE FINE MACHINING OF WORKPIECES, IN PARTICULAR GRAVURE CYLINDERS

[75] Inventor: Max Daetwyler, Bleienbach, Switzerland

[73] Assignee: MDC Max Daetwyler Bleienbach AG, Bleienbach, Switzerland

[21] Appl. No.: 617,508

[22] Filed: Nov. 23, 1990

[30] Foreign Application Priority Data

Nov. 24, 1989 [CH] Switzerland .................. 04226/89

[51] Int. Cl.⁵ .................................. B23C 3/04
[52] U.S. Cl. .................................. 409/131; 407/44; 409/199; 409/204
[58] Field of Search ............... 409/199, 211, 204, 234, 409/131; 407/36, 44; 408/146

[56] References Cited

U.S. PATENT DOCUMENTS 2,726,579  12/1955  Martellotti .
3,602,093  8/1971  Fischer et al. .
4,626,150  12/1986  Papiran et al. .............. 409/199

FOREIGN PATENT DOCUMENTS 1296816  5/1962  France .................. 407/36
1573595  7/1969  France .
240508   11/1986  German Democratic Rep. ... 407/44
263385   11/1970  U.S.S.R. ......................... 409/204

OTHER PUBLICATIONS

MDC Max Datwyler AG, "Polishmaster", 6 pages.

*Primary Examiner*—Daniel W. Howell
*Attorney, Agent, or Firm*—Bell, Seltzer, Park & Gibson

[57] ABSTRACT

Formed in a basic body (13) connected to a drive spindle is a supporting surface (15a) which is at right angles to the rotational axis (10a) of the basic body (13) and on which one end face (16a) of a rotatable setting disk (16) rests. The other end face (16b) of the setting disk (16) is inclined relative to the first mentioned end face (16a). Resting on the setting disk (16) is a cutter holder (17) in which a cutter (18) is held. The cutting edge (19) of this cutter (18) runs approximately in the radial direction. The inclination of the cutting edge (19) of the cutter relative to a plane disposed at right angles to the rotational axis (10a) can now be changed by turning the setting disk (16), as a result of which the desired quality of the circumference of the machined gravure cylinder can be achieved without the cutting edge (19) of the cutter needing to be ground very accurately.

11 Claims, 4 Drawing Sheets

MILLING HEAD FOR THE FINE MACHINING OF WORKPIECES, IN PARTICULAR GRAVURE CYLINDERS

The present invention relates to a milling head for the fine machining of the surface of workpieces, in particular gravure cylinders.

For the fine machining (finishing) of the circumferences of gravure cylinders it is known to use milling tools which have a basic body driven so as to rotate at high speed (about 3800 revolutions/min) and in which a cutter (or a plurality of cutters) lying outside the rotational axis is fixed. This cutter projects at the end face beyond the basic body and the cutting edge of the cutter extends approximately in the radial direction (see, for example, the processing machine for gravure cylinders which is sold by the company MDC Max Dätwyler AG under the designation "POLISHMASTER"). The milling tool is fed in the axial direction of the slowly rotating gravure cylinder to be machined. In order to achieve the requisite fine surface finish, it is necessary to grind the cutting edge of the cutter extremely accurately, that is, to about 1 micron, which is very difficult.

For this reason, there has been a change to holding the cutter in a cutter holder and fixing the latter to the basic body by means of two screws spaced apart in the radial direction. The inclination of the cutter holder and thus of the cutting edge of the cutter can be displaced slightly relative to a plane running at right angles to the rotational axis of the basic body by tightening these screws to varying degrees. Slight slanting of a few microns enables the desired surface finish to be achieved even when the cutting edge is not ground to the accuracy otherwise required. However, the accurate setting of the, as mentioned, very small inclination of the cutting edge by tightening the screws to varying degrees is exceedingly laborious and scarcely possible with the desired accuracy.

The object of the present invention, then, is to provide a milling head of the type mentioned at the beginning which permits in a simple manner an accurate setting of the inclination of the cutting edge of the cutter relative to a plane at right angles to the rotational axis.

This object is achieved according to the invention by the features of the defining part of claim 1.

An accurate adjustment of the inclination of the cutter and thus of the cutting edge of the cutter is now possible without greater difficulties by turning the setting disk.

Preferred further developments of the milling head according to the invention are outlined in the dependent claims.

Figure 2:
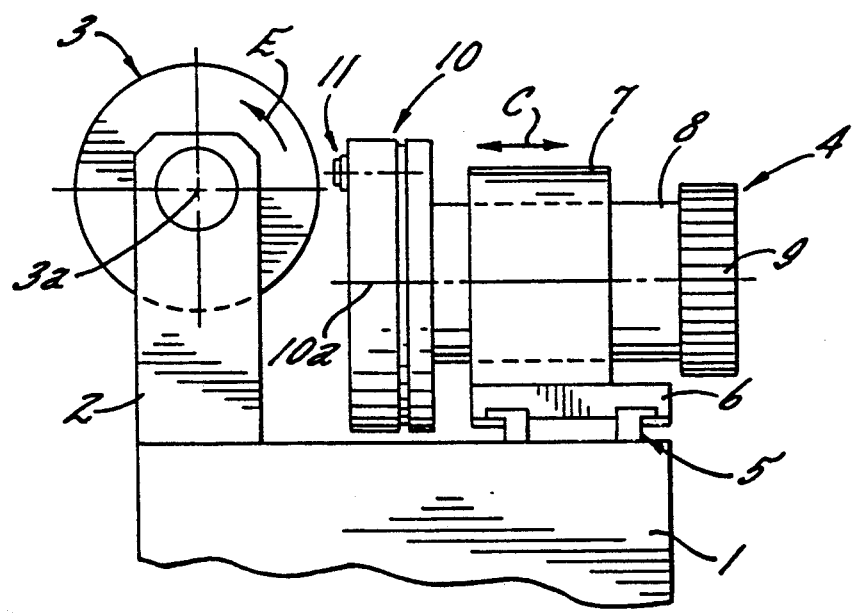
Figure 3:
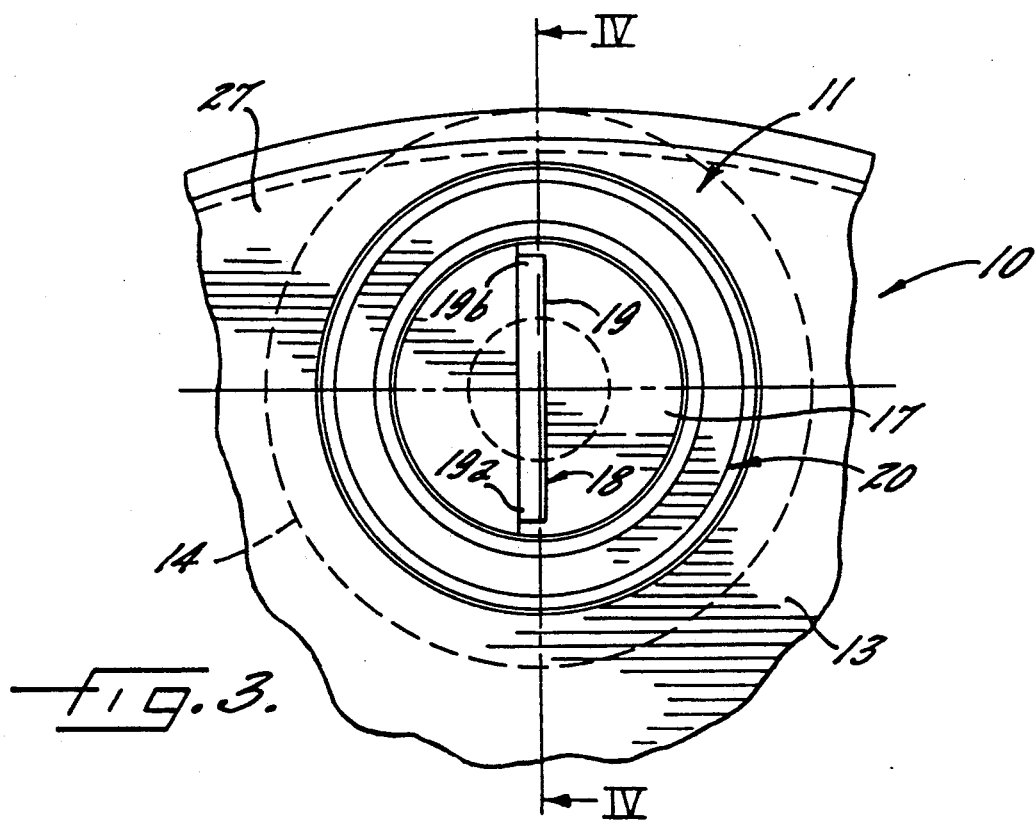
Figure 5:
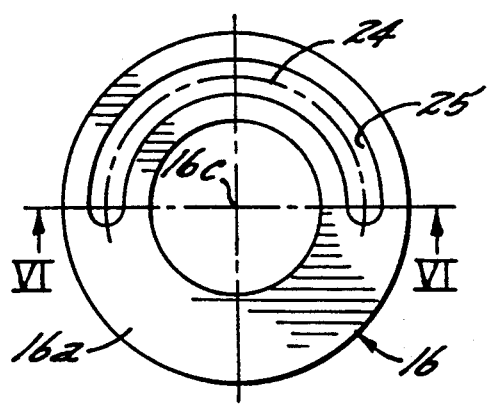
Figure 7:
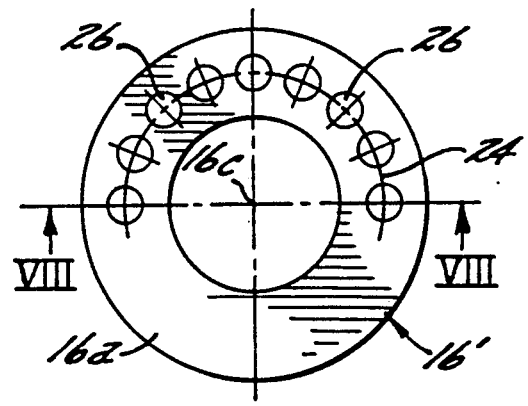
Figure 6:
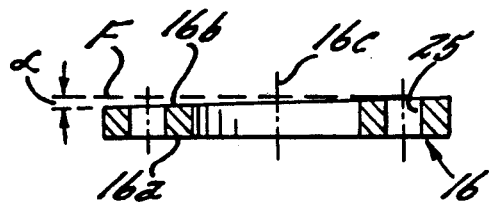
Figure 8:
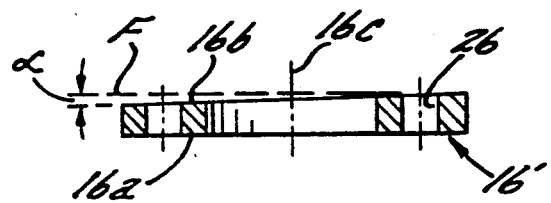
Figure 4:
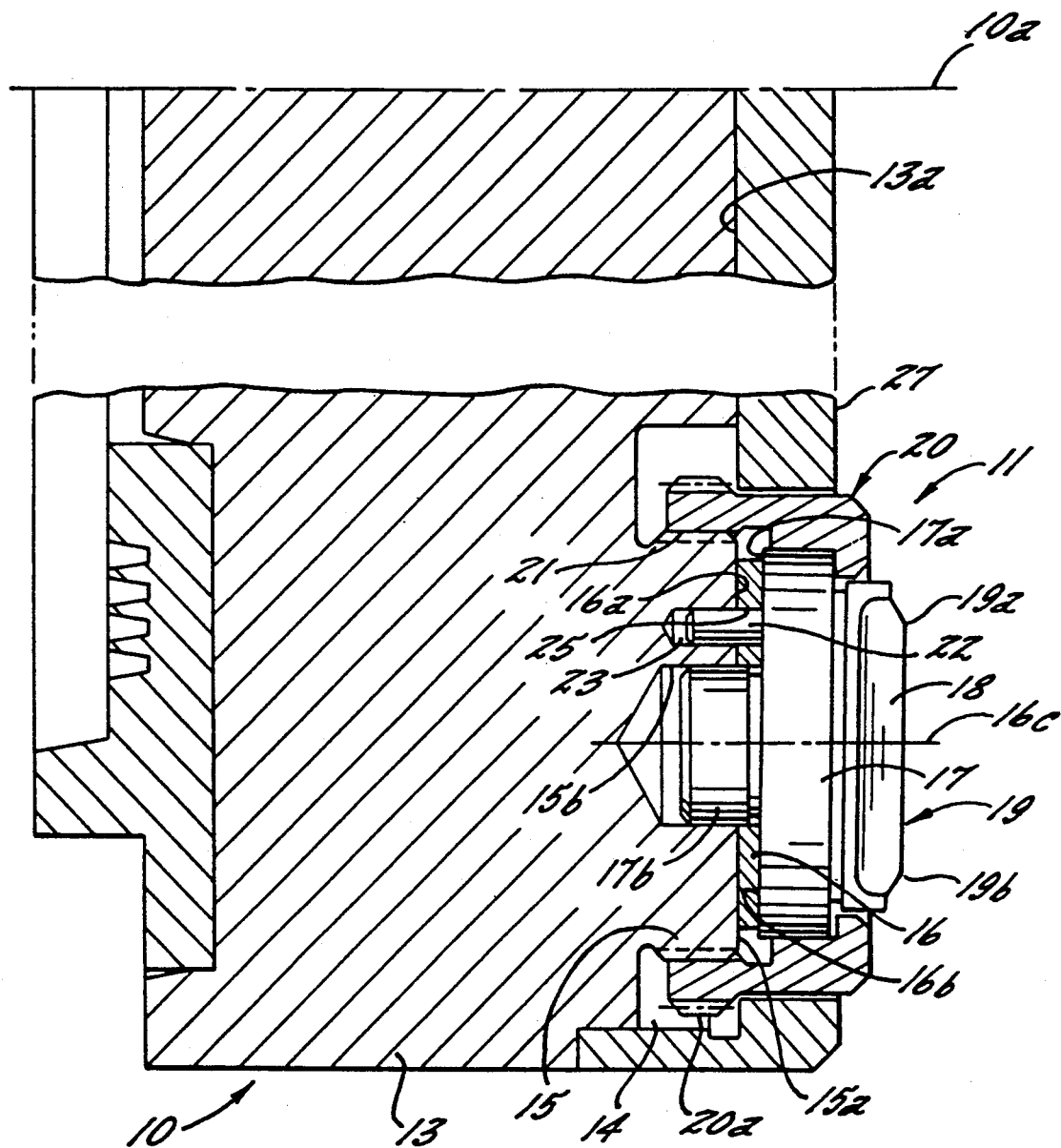
Figure 9:
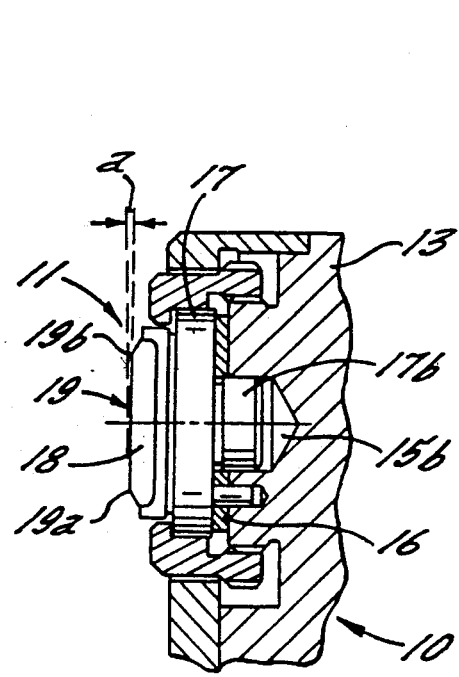
Figure 10:
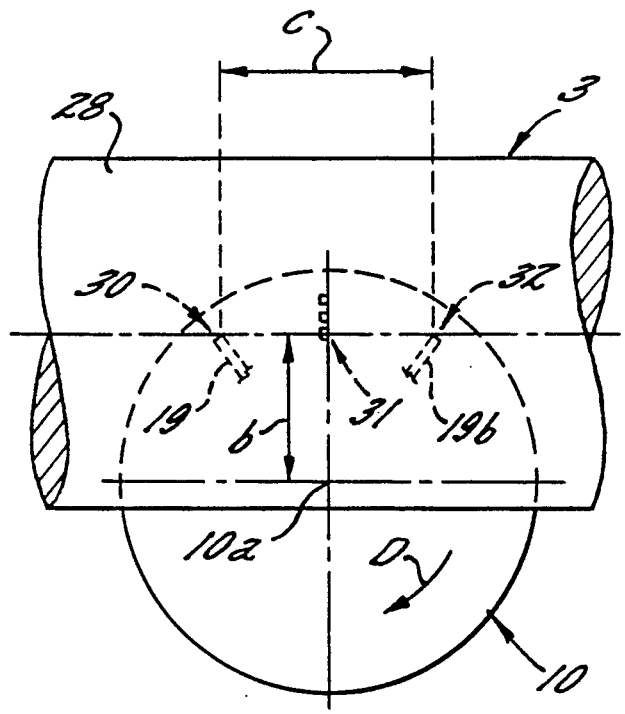
Figure 11:
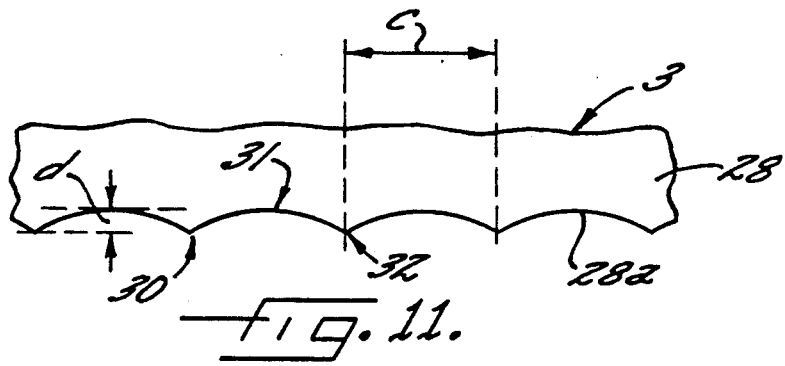
Figure 12:
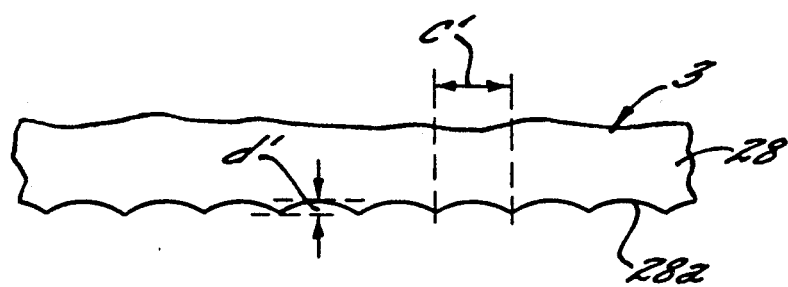

An exemplary embodiment of the subject matter of the invention is described in greater detail below with reference to the drawing, in which, purely schematically:

FIG. 1, shows in a perspective representation and simplified, a machine for the fine machining of gravure cylinders, FIG. 2 shows a detailed side view of the machine according to FIG. 1 in the direction of arrow A, FIG. 3, to an enlarged scale compared with FIGS. 1 and 2, shows in plan view a part of the milling head having the cutter holder carrying the cutter, FIG. 4 shows a section through one half of a milling head along line IV—IV in FIG. 3, FIGS. 5 and 6 show a first embodiment of a setting disk in plan view and respectively in section along the line VI—VI, FIGS. 7 and 8 show a second embodiment of a setting disk in plan view and respectively in section along line VIII—VIII, FIG. 9, in a representation corresponding to FIG. 4, shows the part of the milling head having the cutter, FIG. 10 shows a view of the gravure cylinder together with milling head in the direction of arrow B in FIG. 1, and FIGS. 11 and 12 to a greatly enlarged scale, show an area of the circumference of the gravure cylinder after the fine machining.

The processing machine, shown entirely schematically in FIGS. 1 and 2, has a base 1 and two mountings 2 for mounting the gravure cylinder 3 to be machined. Of the two mountings 2, only one mounting can be recognized in FIG. 2. The gravure cylinder 3, with a longitudinal axis 3a running in the horizontal direction, is rotatably mounted in the two mountings 2. Supported on the base 1 is a milling unit 4 which has a slide 6 guided by a longitudinal guide 5. The longitudinal guide 5 runs at right angles to the drawing plane. Arranged on the slide 6 is a cross slide 7 which can be displaced in a reciprocating manner in the direction of arrow C and carries a drive and mounting part 8 to which a drive motor 9 belongs. The drive motor 9 drives a drive spindle (not shown) to which a milling head 10 is firmly connected. This milling head 10 is driven by the motor 9 so as to rotate about its rotational axis 10a in the direction of arrow D (FIG. 1), and in fact at a speed of about 6,000 revolutions/min.

The milling head 10 has a milling tool 11 which is arranged at a distance from the rotational axis 10a. There is a counterweight 12 diametrically opposite the milling tool 11 relative to the rotational axis 10a (FIG. 1).

The construction of the milling head 10 and in particular of the milling tool 11 will now be described below with reference to FIGS. 3 to 8.

The milling head 10 has a basic body 13 which is connected to the drive spindle in a manner not shown in more detail. An annular recess 14 is made in this basic body 13, which recess 14 is open toward the end face 13a of the basic body 13 and surrounds a cylindrical supporting part 15. The latter has a supporting surface 15a which lies in a plane at right angles to the rotational axis 10a of the milling head 10. Resting on this supporting part 15 is a setting disk 16 which is shown in more detail in FIGS. 5 and 6 or 7 and 8. This setting disk 16 has two end faces 16a and 16b, of which the end face 16a runs at right angles to the center axis 16c of the setting disk 16. The other end face 16b is inclined relative to a plane F running at right angles to this center axis 16c, and in fact by angle α. This angle of inclination is very small. In other words, the difference between the largest and the smallest thickness of the setting disk 16 is in the order of magnitude of hundredths of a millimeter. The adjusting disk 16 now rests with its supporting surface 16a on the supporting surface 15a of the supporting part 15. The base surface 17a of a cutter holder 17 bears on the other end face 16b of the setting disk 16. The cutter holder 17 is provided with a plug-like centering part 17b which passes through the setting disk 16 and engages into a bore 15b in the supporting part 15. Held in this cutter holder 17 is a cutter 18 (diamond) whose cutting edge 19 runs essentially in the radial direction. The end of the cutting edge 19 nearer to the rotational axis 10a of the milling head 10 is designated by 19a, while the other end is designated by 19b. Although an approximately radial orientation of the cutting edge 19 offers particular advantages with regard to achieving a fine surface finish during the machining, it is perfectly possible to arrange the cutter 18 in such a way that the cutting edge 19 is slanted slightly relative to the radial direction.

By means of a cap nut 20 which laterally overlaps the cutter holder 17 and is screwed onto the supporting part 15 by means of a screw thread 21, the cutter holder 17 and the setting disk 16 are pressed against this supporting part 15 and thus held in place. On its outside, the cap nut 20 is provided with a tooth system 20a which extends along its periphery and which is provided for engaging with a tool for releasing and tightening the cap nut 20. The cutter holder 17 carries a positioning pin 22 which projects from its base surface 17a, extends through the setting disk 16 and engages into a bore 23 in the supporting part 15. The cutter holder 17 and thus also the cutter 18 and the cutting edge 19 are positioned in this way. As FIGS. 5 and 6 or 7 and 8 show, various configurations of the setting disk 16 are possible in order to allow the positioning pin 22 to pass through the setting disk 16.

In the variant shown in FIGS. 5 and 6, the setting disk 16 is provided with a passage opening 25 extending along a circular arc 24 concentric to the center axis 16c. The passage opening 25 extends virtually over an angle of 180°. In the other embodiment according to FIGS. 7 and 8 there are passage holes 26 which are arranged in a distributed manner along the circular arc 24 concentric to the center axis 16c. It is readily apparent that, in the embodiment according to FIGS. 5 and 6, the rotatable setting disk 16 can be turned continuously relative to the cutter holder 17, which cannot be changed in its position. In contrast, in the variant according to FIGS. 7 and 8, the setting disk 16 can only assume certain rotational positions relative to the cutter holder 17, which rotational positions are established by the passage holes 26 through which the positioning pin 22 extends.

On its end face 13a, the basic body 13 carries a cover 27.

As a result of the design of the setting disk 16 having two end faces 16a, 16b inclined towards on another, the cutter holder 17 is inclined slightly relative to the supporting surface 15a is of the supporting part 15, which supporting surface 15a is of course at right angles to the rotational axis 10a of the milling head 10. This means that the cutting edge 19 of the cutter is also inclined slightly relative to a plane running at right angles to this rotational axis 10a. By turning the setting disk 16 about its center axis 16c, which is parallel to the rotational axis 10a of the milling head 10, the extent of the inclination of the cutting edge 19 can now be adjusted. To this end, it is necessary to release the cap nut 20. If the setting disk 16 has the design shown in FIGS. 5 and 6, the setting disk 16 can be turned continuously, which permits and infinitely variable adjustment of the inclination. In contrast, in the case of a setting disk as shown in FIGS. 7 and 8, only step-by-step turning and thus only a gradual change in the inclination of the cutting edge 19 is possible.

The purpose served by adjustment of the inclination of the cutting edge 19 and what can be achieved by such slanting of this cutting edge 19 is now to be explained with reference to FIGS. 9 to 12.

The desired accuracy of the circumference 28 of the gravure cylinder 3, that is, absolutely straight surface lines, can only be achieved with great difficulty, and in fact as a result of unavoidable inaccuracies, e.g. inaccurate concentricity of the cylinder 3 and inaccurate straight-line guidance of the slide 6 by the longitudinal guides 5. These inaccuracies can be alleviated somewhat by the cutting edge 19 of the cutter 18, as shown in FIG. 9, being slanted relative to a plane running at right angles to the rotational axis 10a of the milling head 10. Since this FIG. 9 corresponds to FIG. 4, not all components are designated by their reference numerals. As FIG. 9 shows, the cutter holder 17 and thus the cutting edge 19 of the cutter are slanted in such a way that the end 19a of the cutting edge 19 nearer to the rotational axis 10a of the milling head 10 protrudes more than the opposite end 19b of the cutting edge by a small amount a. This dimension a is a few microns, preferably about 2 to 3 microns. FIG. 10 now shows the arrangement of the milling head 10 relative to the gravure cylinder 3, which is driven at a very low speed in the direction of arrow E (FIG. 2). In this arrangement, the axis 10a of the milling head 10 lies below the longitudinal axis 3a of the cylinder by the amount b. During the rotation of the milling head 10 in the direction of arrow D about the axis 10a, the end 19b of the cutting edge 19 of the cutter is the first to come into effect on the cylinder circumference at the point (entry) designated by 30 in FIG. 10. During further rotation, further areas of the cutting edge 19 come into effect, which, as a result of the slanting mentioned of this cutting edge, also means that greater chip removal takes place. The effective depth is greatest at the point designated by 31 in FIG. 10 and then decreases again. At the point (exit) designated by 32 in FIG. 10, the cutting edge 19 with its end 19b, disengages from the circumference 28 of the cylinder 3. This operation is repeated while the milling head 10 is simultaneously advanced in the direction of the longitudinal axis 3a of the cylinder. The width c of the milling path, which, for example, is about 150 mm, is determined by the points 30 and 32.

An area of the cylinder circumference 28 is now shown to a greatly enlarged scale in FIG. 11. The shape of a surface line 28a after the machining is apparent from this FIG. 11. The points designated by 30, 31 and 32 correspond to the points in FIG. 10 designated by the same reference numerals. The surface line 28a is composed of individual circular-arc pieces having a width corresponding to the width c of the milling path. The height of the circular arcs, that is, the distance d between the points 30, 32 and 31 is a few microns, e.g. about 2 to 3 microns. This slight deviation from the ideal straight surface line at the milling path width c specified is acceptable in practice, since peaks which are much too pronounced do not form at the points 30, 32, where adjacent circular-arc pieces meet.

If the width c' of the milling path is halved relative to the width c of the milling path by increasing the distance b (FIG. 10), that is if it is reduced from about 150 mm to about 75 mm, the height of the circular arcs also decreases by about half, that is, d' is only about 1 to 1.5 microns, as shown in FIG. 12.

As already mentioned, the angle of inclination of the cutting edge 19 of the cutter can be adjusted by turning the setting disk 16 so that adaptation to the prevailing conditions can be made in various applications.

If a second setting disk 16 having end faces 16a, 16b, inclined towards one another is provided, which second setting disk 16 bears against the first setting disk 16 an even finer adjustment of the inclination of the cutter holder 17 and thus of the cutting edge 19 is possible by turning one setting disk 16 relative to the other setting disk 16. It goes without saying that, in addition to the setting disk 16, a washer or a plurality of washers of conventional type having end faces parallel to one another can be provided on which the setting disk 16 rests. Such washers have no effect on the inclination adjustment described.

The milling head described above with reference to the figures can also serve to machine workpieces other than gravure cylinders, e.g. to machine flat surfaces of workpieces made of metal or plastic. To this end, the milling head described can be used in conventional milling machines.

I claim:

1. A milling head for the fine machining of the surface of workpieces, having a basic body which can be connected to a drive spindle and can be driven so as to rotate about a rotational axis and to which a cutter holder is fixed in an offset position relative to this rotational axis, in which cutter holder a cutter is held which projects beyond an end face of the basic body and has a cutting edge extending transversely to its direction of rotation, the inclination of which cutting edge, relative to a plane disposed at right angles to the rotational axis, can be adjusted by means of an adjusting arrangement, wherein the adjusting arrangement has at least one setting disk (16) rotatably arranged between the cutter holder (17) and a supporting surface (15a) provided on the basic body (13), the two end faces (16a, 16b) of which setting disk (16) are inclined toward one another.

2. The milling head as claimed in claim 1, wherein the supporting surface (15a) lies in a plane at right angles to the rotational axis (10a), and one end face (16a) of the setting disk (16) is at right angles to its center axis (16c) and the other end face (16b) is inclined relative to this center axis (16c).

3. The milling head as claimed in claim 1 wherein the cutting edge (19) of the cutter (18) extends essentially in radial direction.

4. The milling head as claimed in claim 1 wherein the inclination ($\alpha$) of the cutting edge (19) of the cutter (18) is set in such as way that the end (19a) of the cutting edge (19) of the cutter nearer to the rotational axis (10a) projects further than the opposite end (19b) of the cutting edge (19) of the cutter, preferably by about 2-3 microns.

5. The milling head as claimed in claim 1 which comprises locking means (20) for locking the setting disk (16) in various rotational positions.

6. The milling head as claimed in claim 5, wherein said locking means includes a cap nut which acts on the cutter holder (17), and can be screwed onto the basic body (13) and presses the setting disk (16) against the basic body (13) via the cutter holder (17).

7. The milling head as claimed in claim 1 wherein the cutter holder (17), with a base surface (17a), is in contact with one end face (16b) of the setting disk (16), and the setting disk (16) rests with the other end face (16a) on the supporting surface (15a) of the basic body (13).

8. The milling head as claimed in claim 1 which comprises a positioning pin (22) for positioning the cutter holder (17), which positioning pin (22) detachably connects the latter to the basic body (13) and extends through the setting disk (16).

9. The milling head as claimed in claim 8, wherein the setting disk (16), for the passage of the positioning pin (22), is provided with a number of passage bores (26) arranged in a distributed manner along a concentric circular arc (24) or with a passage opening (25) extending along a concentric circular arc (24).

10. The milling head as claimed in claim 8 wherein the positioning pin (22) is fixed to the cutter holder (17) and engages into a bore (23) in the basic body (13).

11. A method of fine machining the surface of cylinder bodies comprising the steps of
supporting the cylinder body on a milling head connected to a drive spindle, the milling head having a basic body and end face,
rotating the cylinder body about a rotational axis,
moving a cutter into engagement with the cylinder body for machining the cylinder body and wherein the cutter is moved so that the cutter holder on which the cutter is held projects beyond the end face of the basic body and the cutting edge of the cutter extends transverse to the direction of rotation, and
adjusting the inclination of the cutting edge relative to a plane disposed at right angles to the rotational axis by rotating a setting disc engaging the cutter holder, wherein the disc includes opposing inclined faces with one of the faces resting on the supporting surface of the basic body and the other face contacting the cutter holder.

* * * * *